United States Patent
Wang et al.

(10) Patent No.: US 9,784,919 B2
(45) Date of Patent: Oct. 10, 2017

(54) WAVELENGTH DIVISION MULTIPLEXING AND DEMULTIPLEXING TRANSISTOR OUTLINE (TO)-CAN ASSEMBLIES FOR USE IN OPTICAL COMMUNICATIONS, AND METHODS

(71) Applicant: Avago Technologies General IP (Singapore) Pte. Ltd, Singapore (SG)

(72) Inventors: Kou-Wei Wang, Orefield, PA (US); Chih-Chi Lin, Easton, PA (US); Ching-Jung Li, Breinigsville, PA (US); Chihhsien Chang, Taipei (TW); Tien-Tsorng Shih, Taipei (TW); Yao-Chien Chuang, HsinChu (TW)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 14/871,113

(22) Filed: Sep. 30, 2015

(65) Prior Publication Data
US 2017/0090121 A1   Mar. 30, 2017

(51) Int. Cl.
*G02B 6/293* (2006.01)
*G02B 6/42* (2006.01)
*G02B 6/32* (2006.01)

(52) U.S. Cl.
CPC ....... *G02B 6/2938* (2013.01); *G02B 6/29362* (2013.01); *G02B 6/32* (2013.01);
(Continued)

(58) Field of Classification Search
CPC .... G02B 6/2938; G02B 6/29362; G02B 6/32; G02B 6/4206; G02B 6/4214; G02B 6/426; G02B 6/4263; G02B 6/4278; G02B 6/293; G02B 6/29305; G02B 6/2931; G02B 6/29311; G02B 6/29361; G02B 6/2937; G02B 6/29379; G02B 6/42; G02B 6/4201; G02B 6/4204; G02B 6/4215; G02B 6/4246; G02B 6/4256; G02B 6/4262; H04J 14/00; H04J 14/02; H04J 14/0201; H04J 14/0202;
(Continued)

(56) References Cited

U.S. PATENT DOCUMENTS 6,769,816 B2   8/2004   Capewell et al.
7,176,436 B2   2/2007   Zheng et al.
(Continued)

FOREIGN PATENT DOCUMENTS

CN   203616510 U   5/2014

OTHER PUBLICATIONS

Bosa, Eoptolink Technology Inc, 2011, 1 page, http://www.eoptolink.com/en/products/osa/bosa.
(Continued)

*Primary Examiner* — John M Bedtelyon

(57) ABSTRACT

Wavelength division multiplexing and demultiplexing (WDM) TOSA and ROSA TO-can assemblies are provided that are capable of transmitting and receiving optical data signals, respectively, having more than three wavelengths, that can be packaged in smaller packages than those used for existing BOSAs and tri-OSAs, that can be manufactured without requiring a large amount of plant retooling or capital investment, and that can be made available in the market relatively quickly.

16 Claims, 7 Drawing Sheets

(52) U.S. Cl.
CPC ........... *G02B 6/426* (2013.01); *G02B 6/4206* (2013.01); *G02B 6/4214* (2013.01); *G02B 6/4263* (2013.01); *G02B 6/4278* (2013.01)

(58) Field of Classification Search
CPC ............... H04J 14/0204; H04J 14/0205; H04J 14/0209; H04J 14/0212; H04J 14/0213; H04J 14/0215; H04J 14/0217; H04J 14/0216; H04J 14/022; H04J 14/0239; H04B 10/60; H01S 5/00; H01S 5/022; H01S 5/02212; H01S 5/02208; H01S 5/02236; H01S 5/02284; H01S 5/02292; H01S 5/026; H01S 5/0262
See application file for complete search history.

(56) References Cited

U.S. PATENT DOCUMENTS

| | | | |
|---|---|---|---|
| 7,450,858 B2 * | 11/2008 | Verdiell | ............... H01S 5/4087 398/164 |
| 8,854,836 B2 * | 10/2014 | Deng | ..................... G02B 6/428 361/807 |
| 9,213,156 B2 * | 12/2015 | Amit | ..................... G02B 6/4206 |
| 2007/0159773 A1 | 7/2007 | Deng et al. | |
| 2013/0330080 A1 | 12/2013 | Li et al. | |
| 2014/0248057 A1 | 9/2014 | Li et al. | |
| 2014/0355997 A1 | 12/2014 | Miao et al. | |
| 2015/0071638 A1 | 3/2015 | Heroux et al. | |

OTHER PUBLICATIONS

Rosa, Eoptolink Technology Inc, 2011, 2 pages, http://www.eoptolink.com/en/products/osa/rosa.

Tosa, Eoptolink Technology Inc, 2011, 2 pages, http://www.eoptolink.com/en/products/osa/tosa.

"CWDM4 4x25Gb/s TOSA", Product Brief, Avago Technologies, Dec. 3, 2015, 6 pages.

English language machine translation of CN203616510U, published May 28, 2014, 5 pages.

* cited by examiner

WAVELENGTH DIVISION MULTIPLEXING AND DEMULTIPLEXING TRANSISTOR OUTLINE (TO)-CAN ASSEMBLIES FOR USE IN OPTICAL COMMUNICATIONS, AND METHODS

TECHNICAL FIELD OF THE INVENTION

The invention relates to transistor outline (TO)-can assemblies, transmitter optical subassemblies (TOSAs) and receiver optical subassemblies (ROSAs). More particularly, the invention relates to wavelength division multiplexing and demultiplexing (WDM) TO-can TOSA and ROSA assemblies for use in optical communications modules.

BACKGROUND OF THE INVENTION

Optical communications modules used in optical networks for transmitting and receiving optical data signals come in a variety of configurations. An optical communications module may be an optical receiver module with receive-only capabilities, an optical transmitter module with transmit-only capabilities or an optical transceiver module with transmit and receive capabilities. A typical optical transmitter or transceiver module has a TOSA that includes at least one laser diode and various other electrical components. A laser driver circuit of the module that can be either external to or internal to the TOSA outputs an electrical drive signal to each respective laser diode to cause the respective laser diode to be modulated. When the laser diode is modulated, it outputs optical signals that have power levels corresponding to logic 1s and logic 0s. An optics system of the module focuses the optical signals produced by each respective laser diode into the end of a respective transmit optical fiber held within an optical connector module that connects to the optical transmitter or transceiver module.

A typical optical receiver or transceiver module has a ROSA that includes a receiver IC, at least one receive photodiode and various other electrical components. An optics system of the ROSA focuses an optical data signal that is output from the end of an optical fiber onto a photodiode of the ROSA. The photodiode converts the incoming optical data signal into an electrical analog signal. An electrical detection circuit, such as a transimpedance amplifier (TIA), receives the electrical signal produced by the photodiode and outputs a corresponding amplified electrical signal, which is processed by other circuitry of the ROSA to recover the data.

One well known type of optical communications module is a transistor outline (TO)-can assembly. A typical TO-can assembly includes a header and a cap. The header and the cap are typically made of a metal material, such as stainless steel, for example, to allow them to be welded together. The TO-can assembly is generally cylindrical in shape. The header has an upper mounting surface on which a laser diode and/or a photodetector and other electric components are mounted. Electrical circuitry of the TOSA or ROSA is electrically interconnected with proximal ends of electrical leads that pass through the header and have distal ends that are disposed on the opposite side of the header for electrically interconnecting the TOSA or ROSA to external electrical circuitry, such as electrical circuitry of a printed circuit board (PCB).

TO-can assemblies are typically not used in WDM applications that use more than two wavelengths for a number of reasons. One reason is that TO-can packages are relatively bulky in size and shape and, therefore, are not well suited for incorporating multiple sets of discrete optics and other components that are needed for transmitting or receiving optical data signals of multiple wavelengths. Planar lightwave circuits (PLCs), also known as photonic integrated circuits (PICs), are better suited for WDM applications because they allow many optical, optoelectronic and electrical components to be integrated on the same substrate and packaged in a relatively small package. PLCs, however, require special equipment to manufacture them, which leads to large capital investment for plant retooling and time delays in bringing the products to market.

Although it is known to package bi-directional optical subassemblies (BOSAs) in TO-can packages, the existing BOSAs are only capable of using two wavelengths and therefore have only two TO-can devices. It is also known to make three-channel, or tri-, OSAs that have three TO-can devices. The BOSA and tri-OSA packages are also relatively large in size. In addition, due to the configuration of the focusing optics they employ, the known BOSAs and tri-OSAs are limited to having a wavelength spacing between the TO-can devices that is greater than 10 nanometers (nm), which limits the wavelengths that can be used by the BOSAs and tri-OSAs. The focusing optics system configuration also limits the number of channels and wavelengths to three at most due to limitations on the ability of the focusing optics to achieve a great enough focal length if more than three TO-can devices are included. Due to all of these limitations, the existing BOSAs and tri-OSAs are not practical for use in applications that require smaller packaging; or that require more than two or three wavelengths.

Cloud computing and Fourth Generation Long Term Evolution (4G LTE) networks are driving very large demands for increased bandwidth. A need exists for WDM TOSA and ROSA assemblies that are capable of transmitting and receiving optical data signals, respectively, having more than three wavelengths. A need also exists for WDM TOSA and ROSA assemblies that can be packaged in smaller packages than those used for currently available BOSAs and tri-OSAs. A need also exists for WDM TOSA and ROSA assemblies that can be manufactured without requiring a large amount of plant retooling or capital investment and that can be made available in the market relatively quickly.

WRITTEN DESCRIPTION

Figure 1:
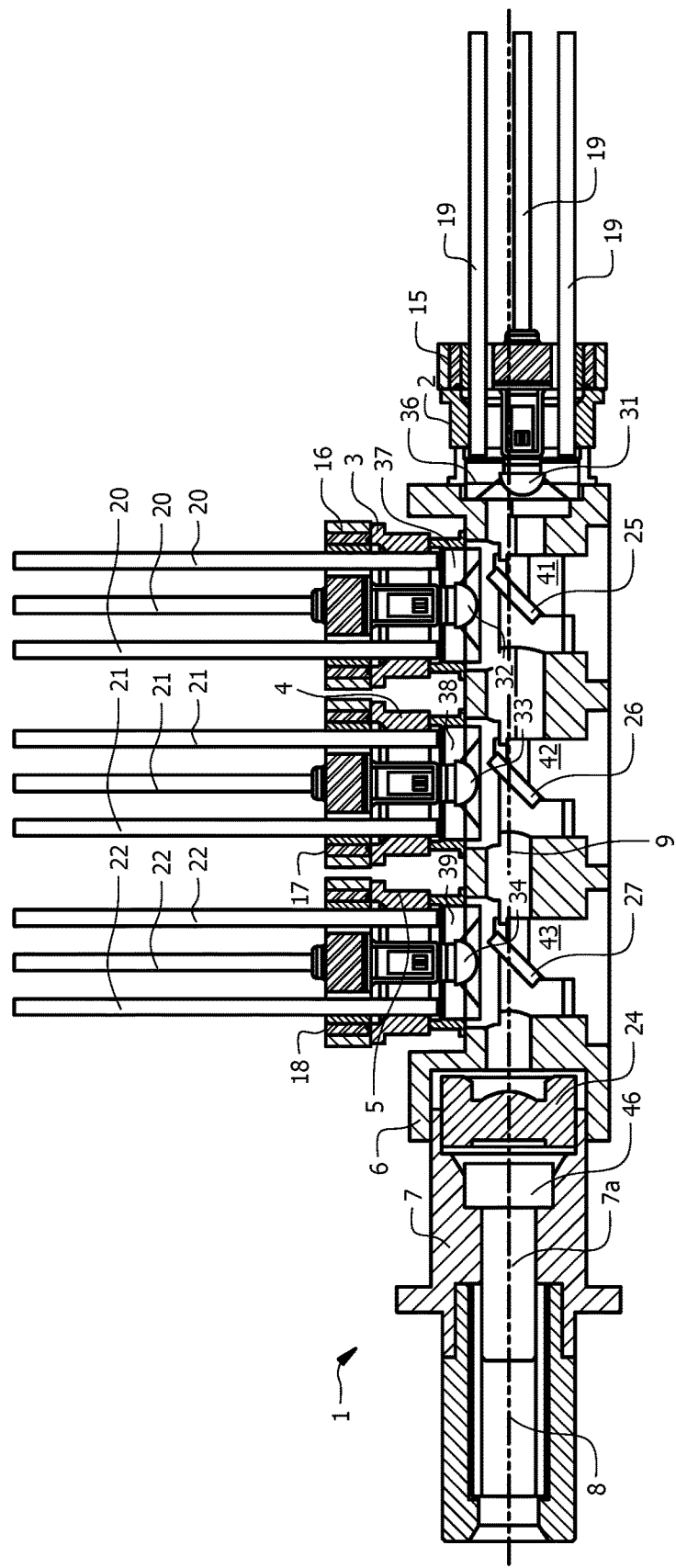
FIG. 1 illustrates a side cross-sectional view of a WDM TOSA TO-can assembly in accordance with an illustrative embodiment.

In accordance with embodiments of the invention, WDM TOSA and ROSA TO-can assemblies are provided that are capable of transmitting and receiving optical data signals, respectively, having more than three wavelengths, that can be packaged in smaller packages than those used for existing BOSAs and tri-OSAs, that can be manufactured without requiring a large amount of plant retooling or capital investment, and that can be made available in the market relatively quickly.

In accordance with an illustrative embodiment, the TOSA and ROSA TO-can assemblies utilize a collimated beam that eliminates the aforementioned limitations on wavelength spacing and channel number. In accordance with an illustrative embodiment, the TOSA and ROSA TO-can assemblies have optics systems that allow the heights of the TO-can devices of the assemblies to be relatively small compared to those employed in existing BOSA and tri-OSA assemblies. The smaller heights of the TO-can devices allow the TOSA or ROSA TO-can assemblies to be incorporated into an optical communications module housing, such as quad small form factor (QSFP) and QSFP+ optical communications module housings, for example.

The WDM TOSA and ROSA TO-can assemblies can be manufactured using industry-standard TO-can manufacturing platforms and low-cost thin film processes for the optics systems so that there is very little, if any, capital investment or plant retooling requirements. Consequently, the TOSA and ROSA TO-can assemblies can be manufactured quickly to meet market demand for greater bandwidth. In addition, well-established active alignment processes for TO-can devices can be used to perform active alignment in the WDM TOSA and ROSA TO-can assemblies.

Illustrative, or exemplary, embodiments will now be described with reference to FIGS. 1-9, in which like reference numerals represent like components, elements or features. It should be noted that elements, features or components shown in the figures are not necessarily drawn to scale, emphasis instead being placed on demonstrating principles and concepts of the invention.

FIG. 1 illustrates a side cross-sectional view of a WDM TOSA TO-can assembly 1 in accordance with an illustrative embodiment. The TOSA TO-can assembly 1 has a first, second, third and fourth TO-can devices 2, 3, 4 and 5, respectively, disposed in an assembly body 6. The assembly body 6 is typically an integrally formed, unitary rectangular part made of metal having generally cylindrical openings formed therein for receiving the TO-can devices 2-5. A receptacle 7 is disposed on a forward end of the assembly body 6. In accordance with this illustrative embodiment, the receptacle 7 is an LC receptacle configured to mate with an LC connector (not shown) disposed on an end of an optical fiber cable. The receptacle 7 has an optical axis 8 that is coaxial with an optical axis 9 of the assembly body 6. The first TO-can device 2 is disposed at a rearward end of the assembly body 6 and has an optical axis that is coaxial with the optical axes 8 and 9. The second, third and fourth TO-can devices 3, 4 and 5, respectively, are disposed in the side of the assembly body 6 and have respective optical axes that are perpendicular to the optical axes 8 and 9.

Each of the TO can devices 2-5 has a generally cylindrical side wall, a header 15-18, respectively, a plurality of electrical leads 19-22, respectively, having proximal ends that are disposed in front of the front side of the header 15-18 and distal ends that are disposed in back of the back side of the header 15-18, and a laser diode (not shown) and monitor photodiode (not shown) mounted on the front side of the header 15-18 or on proximal ends of respective leads 19-22. In accordance with this illustrative embodiment, each TO-can device 2-5 has four leads 19-22, respectively, for making electrical interconnections with the cathode and anode of the laser diodes and with the cathode and anode of the monitor photodiodes. Each TO-can device 19-22 could have more than four leads or fewer than four leads, depending on the electrical and/or optoelectronic components that are included in the TO-can devices 19-22.

In accordance with this illustrative embodiment, the optics system configuration of the TOSA TO-can assembly 1 is made up of a focusing lens 24, three WDM filters 25-27, and four half-ball lenses 31-34. In accordance with this illustrative embodiment, the four half-ball lenses 31-34 are external to the TO-can devices 2-5, respectively, but they could be considered part of the TO-can devices 2-5.

Conventional TO-can devices typically have a lens cap in which a collimating lens (e.g., a ball lens or a full aspherical lens) is disposed. Such lenses contribute significantly to the TO-can devices having relatively large heights. Because the distance between the TO-can devices 2-5 and the WDM filters 25-27 is relatively short, half ball lenses 31-34 can be used to couple the light beams output from the TO-can devices 2-5 onto the WDM filters 25-27, respectively, because the light beams will not diverge significantly before being reflected by the WDM filters 25-27 onto the focusing lens 24. Using the half-ball lenses 31-34 instead of collimating lenses allows the distances from the back sides of the headers 15-18 to the main optical axis 9 to be relatively small, which allows the overall size of the assembly 1 to be relatively small. The relatively small size of the assembly 1 allows it to be used in a QSFP or QSFP+ module, as will be described below with reference to FIG. 3. The dimensions of the assembly in accordance with an illustrative embodiment are described below in more detail.

The half-ball lenses 31-34 are held in lens holders 36-39, respectively. The WDM filters 25-27 are held in filter holders 41-43, respectively. The focusing lens 24 is disposed at the interface of the assembly body 6 and the receptacle 7. An optical isolator 46 is disposed in between an end of a ferrule 7a of the receptacle 7 and the focusing lens 24.

In accordance with this illustrative embodiment, the WDM filters 25-27 are thin-film optical filters made using known thin-film processes. Although other types of filters made by other processes may be used, thin-film filters made by thin-film processes are desirable because they are relatively inexpensive to practice, and thus the filters made by those processes are relatively inexpensive. The WDM filters 25-27 are 45° filters that are at 45° angles relative to the optical axis 9 of the assembly body 6.

Light of wavelength λ1 produced by the laser diode of TO-can device 2 is collimated by the half-ball lens 31 and propagates along the main optical axis 9 toward the WDM filter 25. The WDM filter 25 passes light of wavelength λ1.

Light of wavelength λ2 produced by the laser diode of TO-can device 3 is collimated by the half-ball lens 32, reflected at an angle of 90° by the WDM filter 25 relative to the optical axis of the TO-can device 3, and propagates toward WDM filter 26 parallel to the main optical axis 9.

The WDM filter 26 passes light produced by the laser diodes of TO-can devices 2 and 3 of wavelengths λ1 and λ2, respectively. Light of wavelength λ3 produced by the laser diode of TO-can device 4 is collimated by half-ball lens 33, reflected by the WDM filter 26 at an angle of 90° relative to the optical axis of the TO-can device 4, and propagates toward WDM filter 27 parallel to the main optical axis 9 of the assembly body 6.

The WDM filter 27 passes light produced by the laser diodes of TO-can devices 2, 3 and 4 of wavelengths λ1, λ2 and λ3. Light of wavelength λ4 produced by the laser diode of TO-can device 5 is collimated by half-ball lens 34, reflected by the WDM filter 27 at an angle of 90° relative to the optical axis of the TO-can device 5, and propagates toward the focusing lens 24 in a direction parallel to the main optical axis 9 of the assembly body 6.

When the receptacle 7 is coupled to an end of an optical fiber cable (not shown), the end of the optical fiber of the cable is disposed inside of the ferrule 7a of the receptacle 7. The focusing lens 24 focuses the collimated light beam of wavelengths λ1, λ2, λ3 and λ4 into the end of the optical fiber. The optical isolator 46 prevents light from being reflected from the end of the optical fiber back into the assembly body 6.

In accordance with this illustrative embodiment, λ1, λ2, λ3 and λ4 are about 1270 nm, 1290 nm, 1310 nm and 1330 nm, respectively. Typically, λ1 ranges from about 1264.5 nm to about 1277.5 nm, λ2 ranges from about 1284.5 nm to 1297.5 nm, λ3 ranges from about 1304.5 nm to about 1317.5 nm, and λ4 ranges from about 1324.5 nm to about 1337.5 nm. In accordance with this illustrative embodiment, each of the laser diodes generates an optical data signal of the respective wavelength having a data rate of 10.3125 Gigabits per second (Gb/s) per channel to provide an aggregate data rate of 4×10.3125 Gb/s, or about 40 Gb/s. It should be noted, however, that different wavelengths and different data rates may be used.

Figure 2:
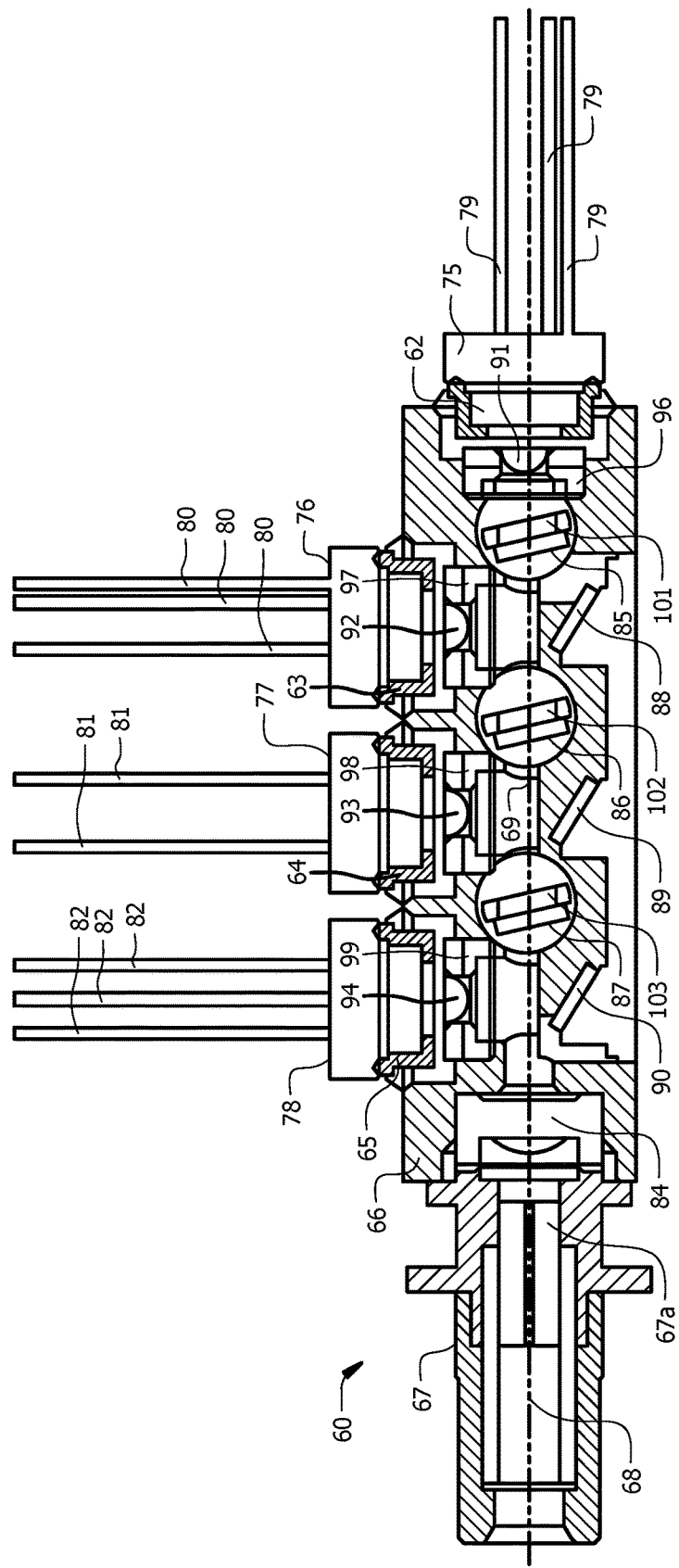
FIG. 2 illustrates a side cross-sectional view of a WDM ROSA TO-can assembly in accordance with an illustrative embodiment.

FIG. 2 illustrates a side cross-sectional view of a WDM ROSA TO-can assembly 60 in accordance with an illustrative embodiment. The WDM ROSA TO-can assembly 60 has a first, second, third and fourth TO-can devices 62, 63, 64 and 65, respectively, disposed in an assembly body 66. The assembly body 66 is essentially identical to the assembly body 6 shown in FIG. 1. A receptacle 67 is disposed on a forward end of the assembly body 66. In accordance with this illustrative embodiment, the receptacle 67 is an LC receptacle configured to mate with an LC connector (not shown) disposed on an end of an optical fiber cable. The receptacle 67 has an optical axis 68 that is coaxial with a main optical axis 69 of the assembly body 66. The first TO-can device 62 is disposed at a rearward end of the assembly body 66 and has an optical axis that is coaxial with the optical axes 68 and 69. The second, third and fourth TO-can devices 63, 64 and 65, respectively, are disposed in the side of the assembly body 66. In accordance with this illustrative embodiment, the second, third and fourth TO-can devices 63, 64 and 65, respectively, have respective optical axes that are perpendicular to the optical axes 68 and 69.

Each of the TO can devices 62-65 has a generally cylindrical side wall, a header 75-78, respectively, a plurality of electrical leads 79-82, respectively, having proximal ends that are disposed in front of the front side of the header 75-78 and distal ends that are disposed in back of the back side of the header 75-78, and a photodiode (not shown) and electrical components mounted on a front side of the header 75-78 or on the proximal ends of the leads 79-82.

In accordance with this illustrative embodiment, the optics system of the WDM ROSA TO-can assembly 60 is made up of a collimating lens 84, three WDM filters 85-87, three mirrors 88, 89 and 90, and four half-ball lenses 91-94. As with the TOSA TO-can assembly 1 shown in FIG. 1, using the half-ball lenses 91-94 instead of collimating lenses in the ROSA TO-can assembly 60 allows the distances from the back sides of the headers 75-78 to the main optical axis 69 to be relatively small, which allows the overall size of the assembly 60 to be relatively small. The dimensions of the assembly 60, in accordance with an illustrative embodiment, are described below in more detail.

The half-ball lenses 91-94 are held in lens holders 96-99, respectively. The WDM filters 85-87 are held in filter holders 101-103, respectively. The collimating lens 84 is disposed at the interface of the assembly body 66 and the receptacle 67. In accordance with this illustrative embodiment, the WDM filters 85-87 are thin-film optical filters made using known thin-film processes. The WDM filters 85-87 are at an angle, α, relative to the optical axis 69 of the assembly body 66. The mirrors 88, 89 and 90 are at an angle, β, relative to the optical axis 69 of the assembly body 66. The angle α is less than 45° and the angle β is equal to 45° minus α. In the illustrative embodiment shown in FIG. 2, α=13° and β=32°.

When an end of the optical fiber of an optical fiber cable (not shown) is disposed inside of the ferrule 67a of the receptacle 67, the collimating lens 84 collimates the light beam of wavelengths λ1, λ2, λ3 and λ4 passing out of the end of the optical fiber and directs the collimated light beam along the main optical axis 69 toward the TO can device 62. The WDDM filter 87 passes light of wavelengths λ1, λ2 and λ3 and reflects light of wavelength λ4 onto mirror 90. Mirror 90 reflects the light of wavelength λ4 in a direction perpendicular to the optical axis 69 of the assembly body 66 and parallel to the optical axis of the TO-can device 65 toward the half-ball lens 94. The half-ball lens 94 receives the reflected light and focuses it onto the photodiode of the TO can device 65.

The WDM filter 86 passes light of wavelengths λ1 and λ2 and reflects light of wavelength λ3 onto mirror 89. Mirror 89 reflects the light of wavelength λ3 in a direction perpendicular to the main optical axis 69 of the assembly body 66 and parallel to the optical axis of the TO-can device 64. The half-ball lens 93 receives the reflected light and focuses it onto the photodiode of the TO can device 64.

The WDM filter 85 passes light of wavelengths λ1 and reflects light of wavelength λ2 onto mirror 88. Mirror 88 reflects the light of wavelength λ2 in a direction perpendicular to the main optical axis 69 of the assembly body 66 and parallel to the optical axis of the TO-can device 63. The half-ball lens 92 receives the reflected light and focuses it onto the photodiode of the TO can device 63. The light of wavelength λ1 is focused by the half-ball lens 91 onto the photodiode of the TO can device 62.

Figure 3:
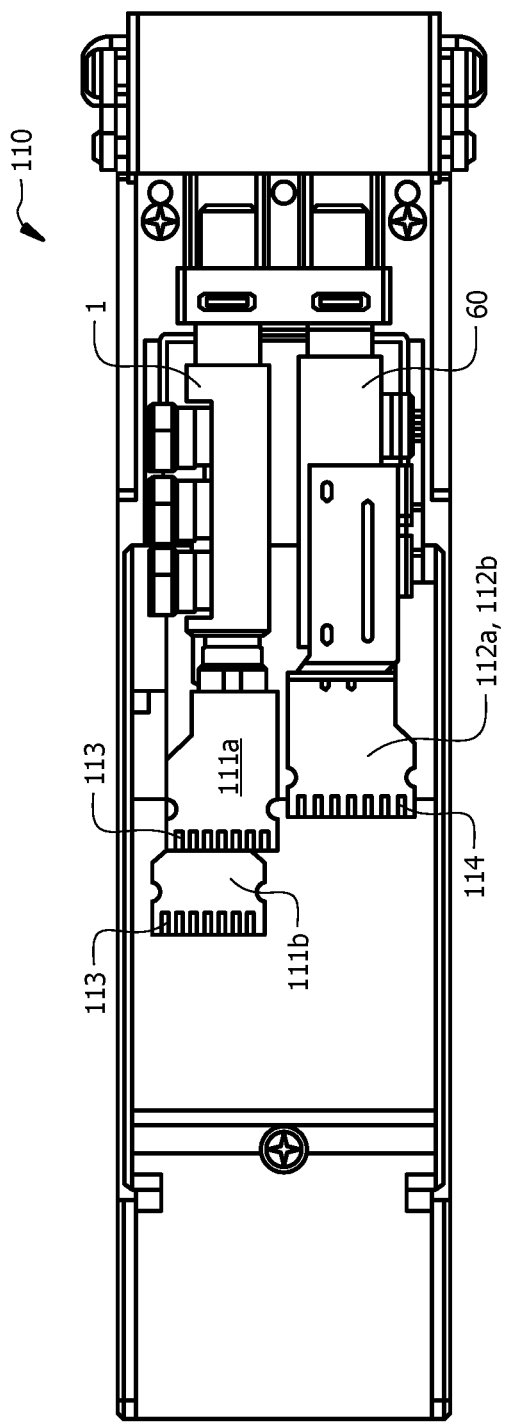
FIG. 3 illustrates a top plan view of a lower housing portion of a QSFP+ module having one of the WDM TOSA TO-can assemblies shown in FIG. 1 and one of the WDM ROSA TO-can assemblies shown in FIG. 2 mounted on an inner surface thereof.

FIG. 3 illustrates a top plan view of a lower housing portion 110 of a QSFP+ module having one of the WDM TOSA TO-can assemblies 1 and one of the WDM ROSA TO-can assemblies 60 mounted on an inner surface thereof. As indicated above, in accordance with an illustrative embodiment, each of the laser diodes of the TO-can devices 2-5 generates an optical data signal having a data rate of 10.3125 Gb/s per channel to provide an aggregate transmit data rate of 40 Gb/s. Each of the photodiodes of the TO-can devices 62-65 converts an optical data signal having a data rate of 10.3125 Gb/s per channel into an electrical data signal having the same data rate to provide an aggregate receive data rate of 40 Gb/s. Thus, incorporating one of each of the assemblies 1 and 60 into a QSFP+ transceiver module allows a data rate of 40 Gbps in each direction to be achieved. Such a module is capable of meeting data center requirements and of being used to meet demands for increased bandwidth in cloud computing and high-volume data center environments.

The invention is not limited with respect to the operating speed of the laser diodes and photodiodes. In accordance with another illustrative embodiment, each of the laser diodes of the TO-can devices 2-5 generates an optical data signal having a data rate of 25 Gb/s per channel to provide an aggregate transmit data rate of for the WDM TOSA assembly of 4×25 Gb/s=100 GBPS. In accordance with that embodiment, each of the photodiodes of the TO-can devices 62-65 converts an optical data signal having a data rate of 25 Gb/s per channel into an electrical data signal having the same data rate to provide the WDM ROSA assembly 60 with an aggregate receive data rate of 100 Gb/s.

Although the leads 19-22 and 79-82 of the TO-can devices 2-5 and 62-65, respectively, are not visible in FIG. 3, they are electrically interconnected with respective electrical contacts (not shown) of flex circuits 111a, 111b and 112a, 112b respectively, in accordance with this illustrative embodiment. In accordance with an illustrative embodiment, two flex circuits are used for each of the assemblies 1 and 60. One flex circuit 111a is electrically connected to the leads 19 and 21 of TO can devices 2 and 4, respectively, and another flex circuit 111b is electrically connected to the leads 20 and 22 of TO can devices 3 and 5, respectively. Similarly, one flex circuit 112a is electrically connected to the leads 79 and 81 of TO can devices 62 and 64, respectively, and another flex circuit 112b is electrically connected to the leads 80 and 82 of TO can devices 63 and 65, respectively. For each of the assemblies 1 and 60, the associated flex circuits 111a, 111b and 112a, 112b extend along opposite sides of the assembly bodies 6 and 66, respectively. The visible ends of the flex circuits 111a, 111b and 112a, 112b have electrical contacts 113 and 114 thereon, respectively, for electrically interconnecting the assemblies 1 and 60 with other circuitry (not shown) of the QSFP+ module.

Figure 4A:
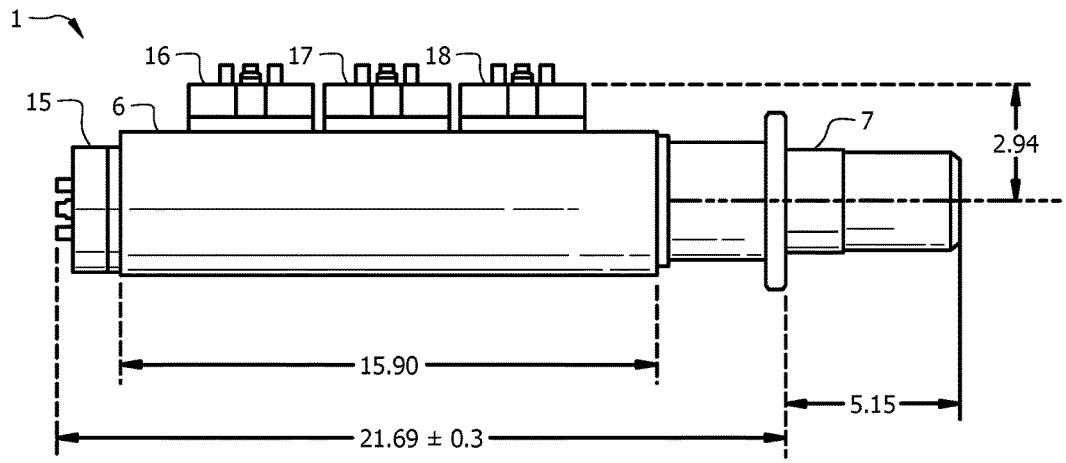
FIGS. 4A and 4B illustrate side and back end views, respectively, of the WDM TOSA TO-can assembly shown in FIG. 1.
Figure 4B:
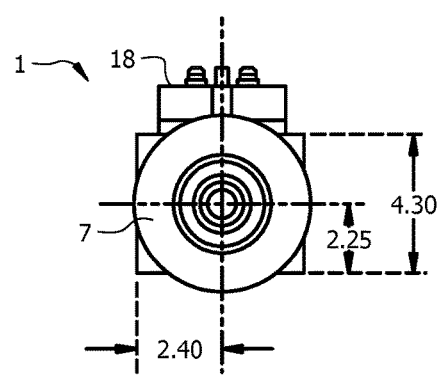

FIGS. 4A and 4B illustrate side and back end views, respectively, of the WDM TOSA TO-can assembly 1 shown in FIG. 1. In FIGS. 4A and 4B, some of the dimensional aspects of the assembly 1, in accordance with an illustrative embodiment, are shown. The dimensions are given in millimeters (mm). The invention is not limited to the dimensions given in FIGS. 4A and 4B. As indicated above, the distance between the back sides of the headers 16-18 of the TO-can devices 3-5, respectively, and the main optical axis 9 of the assembly body 6 can be relatively short compared to the existing BOSA and tri-OSA TO-can assemblies. For example, in accordance with this illustrative embodiment, this distance is about 2.94 mm, which is easily short enough to allow the assembly 60 to fit inside the housing 110 shown in FIG. 3. In comparison, this distance in the existing BOSA and tri-OSA TO-can assemblies is in the range of about 4 to 6 mm, which would be difficult or impossible to fit inside the housing 110 shown in FIG. 3.

In accordance with this illustrative embodiment, the assembly body 6 is about 16 mm in length and the receptacle 7 is about 9 mm in length, giving the assembly 1 an overall length of about 26.84 mm. The assembly body 6 has a width of about 4.8 mm and an overall height from the lower surface of the assembly body 6 to the back side of the header 18 of about 5.15 mm. As indicated above, the assembly 1 is not limited to having these dimensions, but they are given to demonstrate that the assembly 1 can be made small enough to fit inside of a QSFP or QSFP+ module housing, such as that shown in FIG. 3.

Figure 5:
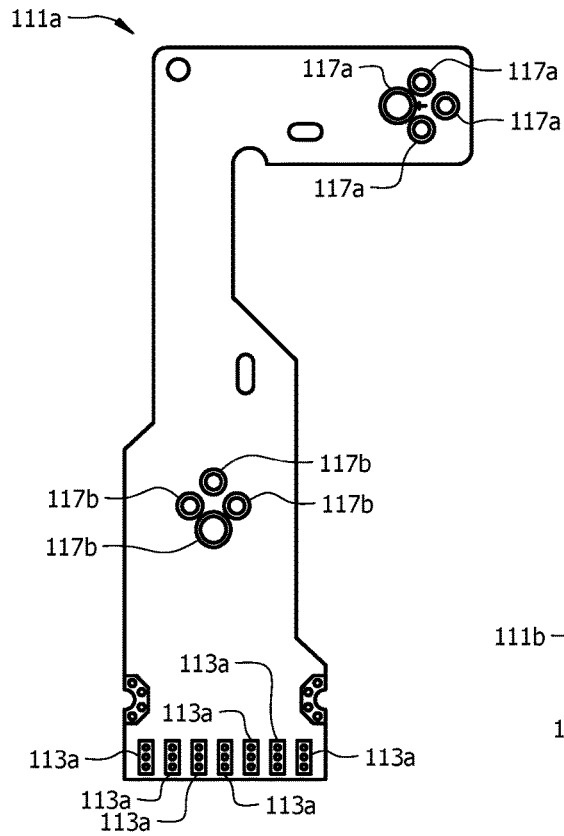
FIG. 5 illustrates a top view of one the flex circuits shown in FIG. 3 that is used with the WDM TOSA TO-can assembly shown in FIG. 1.
Figure 6:
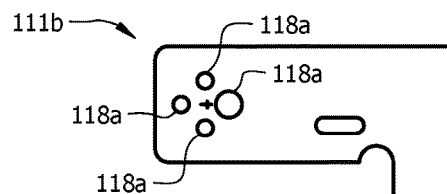
FIG. 6 illustrates a top view of one the flex circuits shown in FIG. 3 that is used with the WDM TOSA TO-can assembly shown in FIG. 1.
Figure 6:
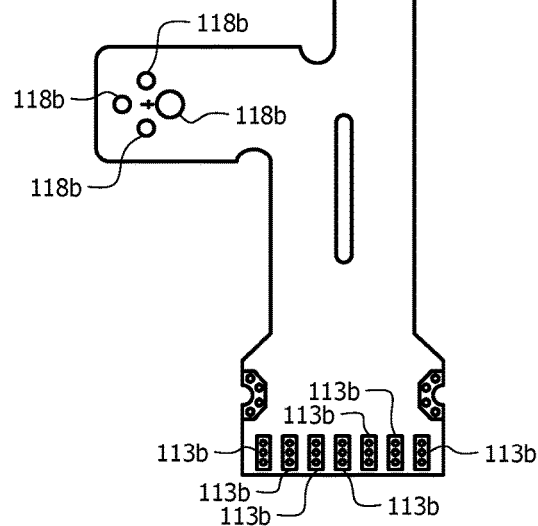

FIGS. 5 and 6 illustrate top views of the flex circuits 111a and 111b, respectively, shown in FIG. 3. The flex circuit 111a has electrical contacts 117a and 117b thereon for electrically interconnecting with the leads 19 and 21, respectively, of TO-can devices 2 and 4, respectively. The flex circuit 111b has electrical contacts 118a and 118b thereon for electrically interconnecting with the leads 20 and 22, respectively, of TO-can devices 3 and 5, respectively. The flex circuits 111a and 111b have electrical contacts 113a and 113b thereon for electrically interconnecting with other electrical circuitry (not shown) of the optical communications module (not shown) in which the assembly 1 is employed. The flex circuits 111a and 111b are flexible printed circuits made of a flexible substrate material, e.g., polyetherimide, having electrical conductors (not shown) extending through it. The electrical conductors of flex circuit 111a interconnect electrical contacts 117a or 117b with the respective electrical contacts 113a. Likewise, the electrical conductors of flex circuit 111b interconnect the electrical contacts 118a or 118b with respective electrical contacts 113b.

Figure 7A:
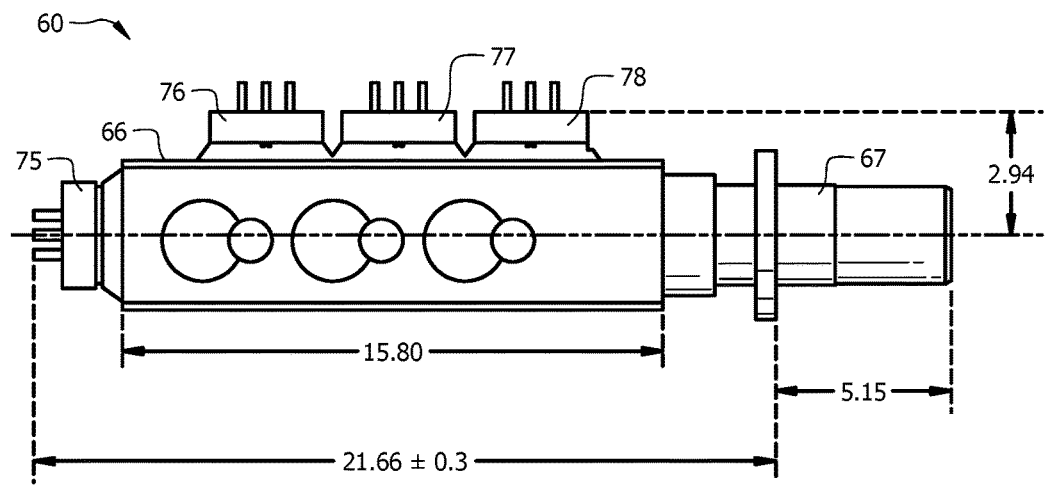
FIGS. 7A and 7B illustrate side and back end views, respectively, of the WDM ROSA TO-can assembly shown in FIG. 2.
Figure 7B:
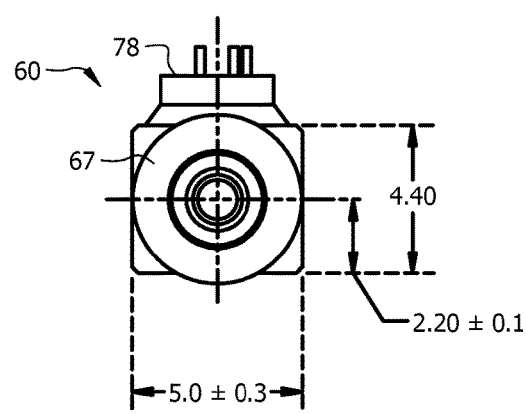

FIGS. 7A and 7B illustrate side and back end views, respectively, of the WDM ROSA TO-can assembly 60 shown in FIG. 2. FIGS. 7A and 7B illustrate some of the dimensional aspects in millimeters of the assembly 60 in accordance with an illustrative embodiment. The WDM ROSA TO-can assembly 60 is not limited to the dimensions given in FIGS. 7A and 7B. The dimensions of the assembly 60 are about the same as those of the assembly 1 shown in FIGS. 4A and 4B. The assembly body 66 is about 16 mm in length and the receptacle 67 is about 9 mm in length, giving the assembly 60 an overall length of about 26.81 mm. The assembly body 66 has a width of about 5.0 mm and an overall height from the lower surface of the assembly body 66 to the back side of the header 78 of about 5 mm. As indicated above, the assembly 60 is not limited to having these dimensions, but they demonstrate that the assembly 60 can be made small enough to fit inside of a QSFP or QSFP+ module housing, such as that shown in FIG. 3.

Figure 8:
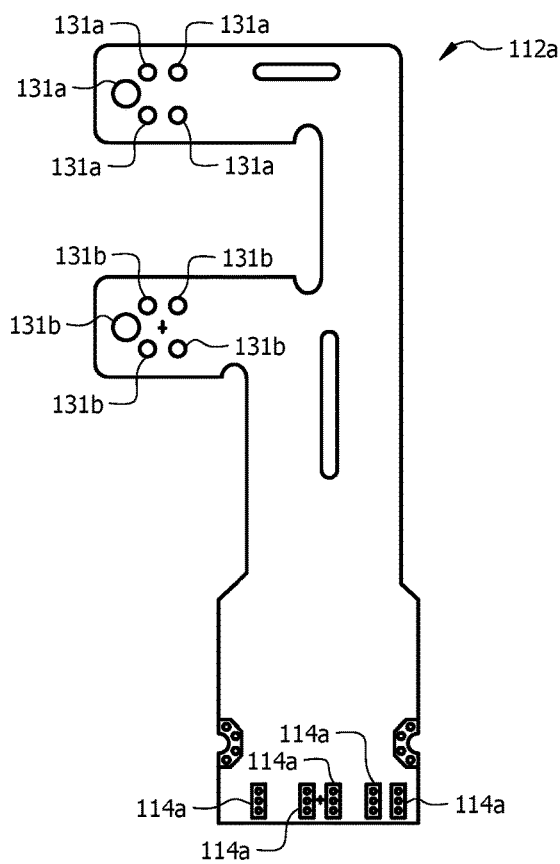
FIG. 8 illustrates a top view of one of the flex circuits shown in FIG. 3 that is used with the WDM ROSA TO-can assembly shown in FIG. 2.
Figure 9:
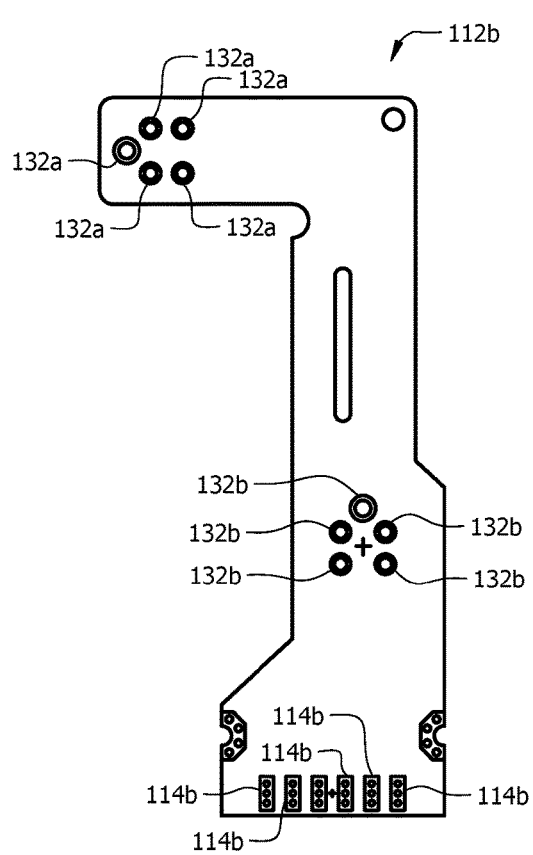
FIG. 9 illustrates a top view of one of the flex circuits shown in FIG. 3 that is used with the WDM ROSA TO-can assembly shown in FIG. 2.

FIGS. 8 and 9 illustrate top views of the flex circuits 112a and 112b, respectively, shown in FIG. 3. The flex circuit 112a has electrical contacts 131a and 131b thereon for electrically interconnecting with the leads 79 and 81, respectively, of TO-can devices 62 and 64, respectively. The flex circuit 112b has electrical contacts 132a and 132b thereon for electrically interconnecting with the leads 80 and 82, respectively, of TO-can devices 63 and 65, respectively. The flex circuits 112a and 112b have electrical contacts 114a and 114b thereon, respectively, for electrically interconnecting the flex circuits 112a and 112b with other electrical circuitry (not shown) of the optical communications module (not shown) in which the assembly 60 is employed.

Thus, the above description of the illustrative embodiments demonstrates that WDM TOSA and WDM ROSA TO-can assemblies are achievable that are capable of transmitting and receiving optical data signals, respectively, having more than three wavelengths, that can be packaged in smaller packages than those used for existing BOSAs and tri-OSAs, that can be manufactured without requiring a large amount of plant retooling or capital investment, and that can be made available in the market relatively quickly.

It should be noted that the invention has been described with reference to illustrative embodiments for the purposes of demonstrating the principles and concepts of the invention. Many modifications may be made to the illustrative embodiments described herein without deviating from the scope of the invention. For example, while each of the assemblies 1 and 60 has been shown as having four TO-can devices, they may each have more than four TO-can devices and as few as two TO-can devices. Also, while the assemblies 1 and 60 have been described as using specific wavelengths, they may use any desired wavelengths and wavelength spacings. Persons skilled in the art will understand, in view of the description provided herein, that these and other modifications are within the scope of the invention.

What is claimed is:

1. A wavelength division demultiplexing (WDM) receiver optical subassembly (ROSA) transistor-outline (TO)-can assembly comprising:
    an assembly body having a forward end, a rearward end opposite the forward end, and an optical receptacle on the forward end that is adapted to hold an end of an optical fiber that is capable of carrying an optical signal having at least N wavelengths of light, where N is a positive integer that is equal to or greater than four, the assembly body having a main optical axis that extends from the forward end to the rearward end;
    at least N TO-can devices disposed on or formed in the assembly body, a first of the N TO-can devices being located in the rearward end of the assembly body and having an optical axis that is coaxial with main optical axis, wherein second through an Nth TO-can devices of the N TO-can devices are located in a side wall of the assembly body and have respective optical axes that are at a non-zero-degree angle to the main optical axis, wherein each of the N TO-can devices has an optoelectronic device therein that operates at a different wavelength of the N wavelengths; and
    an optics system disposed in the assembly body, the optics system coupling light between the optoelectronic devices of the N TO-can devices and the end of the optical fiber, the optics system including an optical wavelength division demultiplexing (WDM) arrangement comprising N−1 WDM filters disposed along the main optical axis and N−1 mirrors associated with the N−1 WDM filters, respectively, the N−1 mirrors being disposed at respective positions that are aligned with the respective optical axes of the second through Nth T-O can devices, wherein each WDM filter directs one of the light beams of one of the second through Nth wavelengths onto the associated mirror and wherein the associated mirror directs the respective light beam along the optical axis of the respective TO-can device toward the respective TO-can device, and wherein the light beam of the first wavelength of the N wavelengths passes through the N WDM filters and propagates toward the first TO-can device.

2. The WDM ROSA TO-can assembly of claim 1, wherein the optics system further includes:
    N half-ball lenses, each half-ball lens coupling a respective one of the N light beams onto the respective optoelectronic device of the respective TO-can device.

3. The WDM ROSA TO-can assembly of claim 2, further comprising:
    a collimating lens located at the forward end of the assembly body, the collimating lens collimating the optical signal of the N wavelengths of light as the optical signal passes out of the end of optical fiber, wherein each of the WDM filters operates on a collimated light beam.

4. The WDM ROSA TO-can assembly of claim 1, wherein each of the WDM filters is at a non-zero-degree angle, α, relative to the main optical axis, wherein the non-zero-degree angle of the WDM filters relative to the main optical axis is less than 45 degrees.

5. The WDM ROSA TO-can assembly of claim 4, wherein each of the mirrors is at an angle, β, relative to the main optical axis, wherein β is equal to 45 degrees minus α.

6. The WDM ROSA TO-can assembly of claim 1, wherein the optical axes of the second through Nth T-O-can devices are at 90° angles relative to the main optical axis.

7. The WDM ROSA TO-can assembly of claim 1, wherein a distance from back sides of respective headers of the second through Nth TO-can devices to the main optical axis is about three millimeters (mm).

8. The WDM ROSA TO-can assembly of claim 1, wherein each of the optoelectronic devices operates at a data rate of at least 10.3125 Gigabits per second (Gbps) such that the TO-can assembly operates at a data rate of at least about 40 Gbps.

9. The WDM ROSA TO-can assembly of claim 1, wherein each of the optoelectronic devices operates at a data rate of at least 25 Gigabits per second (Gbps) such that the TO-can assembly operates at a data rate of at least about 100 Gbps.

10. A quad small form factor pluggable (QSFP) optical transceiver module comprising:
    a QSFP module housing;
    a wavelength division multiplexing transmitter optical subassembly (TOSA) disposed in the QSFP module housing; and
    a wavelength division demultiplexing receiver optical subassembly (ROSA) disposed in the QSFP module housing, the TOSA and ROSA each comprising a transistor-outline (TO)-can assembly comprising:
        an assembly body having a forward end, a rearward end opposite the forward end, and an optical receptacle on the forward end that is adapted to hold an end of an optical fiber that is capable of carrying an optical signal having at least N wavelengths of light, where N is a positive integer that is equal to or greater than four, the assembly body having a main optical axis that extends from the forward end to the rearward end;
        at least N TO-can devices disposed on or formed in the assembly body, a first of the N TO-can devices being located in the rearward end of the assembly body and having an optical axis that is coaxial with a main optical axis, wherein second through an Nth TO-can devices of the N TO-can devices are located in a side wall of the assembly body and have respective optical axes that are at a non-zero-degree angle to the main optical axis, wherein each of the N TO-can devices has an optoelectronic device therein that operates at a different wavelength of the N wavelengths; and
        an optics system disposed in the assembly body, the optics system coupling light between the optoelectronic devices of the N TO-can devices and the end of the optical fiber.

11. A wavelength division multiplexing (WDM) transmitter optical subassembly (TOSA) transistor-outline (TO)-can assembly comprising:
    an assembly body having a forward end, a rearward end opposite the forward end, and an optical receptacle on the forward end that is adapted to hold an end of an optical fiber that is capable of carrying an optical signal having at least N wavelengths of light, where N is a positive integer that is equal to or greater than four, the assembly body having a main optical axis that extends from the forward end to the rearward end;

at least N TO-can devices disposed on or formed in the assembly body, a first of the N TO-can devices being located in the rearward end of the assembly body and having an optical axis that is coaxial with the main optical axis, wherein second through an Nth TO-can devices of the N TO-can devices are located in a side wall of the assembly body and have respective optical axes that are at a non-zero-degree angle to the main optical axis, wherein each of the N TO-can devices has an optoelectronic device therein that operates at a different wavelength of the N wavelengths; and an optics system disposed in the assembly body, the optics system including N half-ball lenses and an optical wavelength division multiplexing (WDM) arrangement, the WDM arrangement performing WDM to combine N light beams of first through Nth respective wavelengths of light produced by N optoelectronic devices of the N TO-can devices, respectively, into a combined optical signal having at least the N wavelengths of light, the WDM arrangement comprising N-1 WDM filters disposed along the main optical axis, wherein the N half-ball lenses collimate the N light beams and couple the N collimated light beams onto a respective WDM filter, wherein each WDM filter reflects one of the collimated light beams of the second through an Nth wavelengths toward the forward end of the assembly body, and wherein each WDM filter passes any of the collimated light beams that are incident thereon except for the collimated light beam that is reflected by the respective WDM filter.

12. The WDM ROSA TO-can assembly of claim 11, wherein the optical axes of the second through Nth TO-can devices are at 90° angles relative to the main optical axis, and wherein the WDM filters are at 45° angles relative to the main optical axis.

13. The WDM ROSA TO-can assembly of claim 11, further comprising:
 a collimating lens located at the forward end of the assembly body, the collimating lens coupling the combined optical signal onto the end of optical fiber.

14. The WDM ROSA TO-can assembly of claim 11, wherein a distance from back sides of headers of the second through Nth TO-can devices to the main optical axis is about three millimeters (mm).

15. The WDM ROSA TO-can assembly of claim 11, wherein each of the optoelectronic devices operates at a data rate of at least 10.3125 Gigabits per second (Gbps) such that the TO-can assembly operates at a data rate of at least about 40 Gbps.

16. The WDM ROSA TO-can assembly of claim 11, wherein each of the optoelectronic devices operates at a data rate of at least 25 Gigabits per second (Gbps) such that the TO-can assembly operates at a data rate of about 100 Gbps.

\* \* \* \* \*